Feb. 17, 1970   F. W. SCHLUE, JR   3,495,597

HARVESTING MACHINE

Filed Sept. 8, 1966   2 Sheets-Sheet 1

INVENTOR.
Frank W. Schlue, Jr.
BY
WILSON, SETTLE, BATCHELDER
ATTYS.   & CRAIG.

Feb. 17, 1970  F. W. SCHLUE, JR  3,495,597

HARVESTING MACHINE

Filed Sept. 8, 1966  2 Sheets-Sheet 2

INVENTOR.
Frank W. Schlue, Jr.
BY
WILSON, SETTLE, BATCHELDER
ATT'YS. & CRAIG.

United States Patent Office 3,495,597
Patented Feb. 17, 1970

3,495,597
HARVESTING MACHINE
Frank W. Schlue, Jr., Davenport, Iowa, assignor to J. I. Case Company, Racine, Wis., a corporation of Wisconsin
Filed Sept. 8, 1966, Ser. No. 577,867
Int. Cl. A01f 7/00, 12/38
U.S. Cl. 130—26    2 Claims

ABSTRACT OF THE DISCLOSURE

A mounting and driving mechanism for a crop separator forming part of a harvesting machine and in which the mechanism includes driving means which engage a first part of the crop separator and biasing means operatively connecting another part of the crop separator to the harvesting machine so that the crop separator is resiliently supported within the harvesting machine and said drive means will oscillate the crop separator within the machine.

---

The present invention relates generally to harvesting machines and more particularly to improved mounting means for crop separators of harvesting machines.

In modern harvesting machines for threshing crops, it is common to employ a crop separator on which the grain remaining in the harvested crop, after being passed through a threshing cylinder, is separated from the harvested crop by agitation of the crop separator. The most common types of crop separators are the strawrack, which is a unitary structure movably mounted with respect to the harvesting machine and oscillated along an arcuate path, and straw walkers which comprises a plurality of walker sections oscillated in a nonsynchronous movement to thereby separate the grain from the harvested crop.

The primary object of the present invention is to provide an improved separating operation in a harvesting machine.

The further object is to provide mounting means for crop separators which will improve the separating efficiency of the crop separator.

Other objects and features of the present invention will become apparent by reference to the following specification and to the accompanying drawing wherein.

According to the invention, the crop separator, such as a strawrack or a plurality of transversely disposed straw walkers are connected to the threshing machine through suitable resilient means, such as springs, which will considerably increase the agitation of the crop separator.

Figure 1:
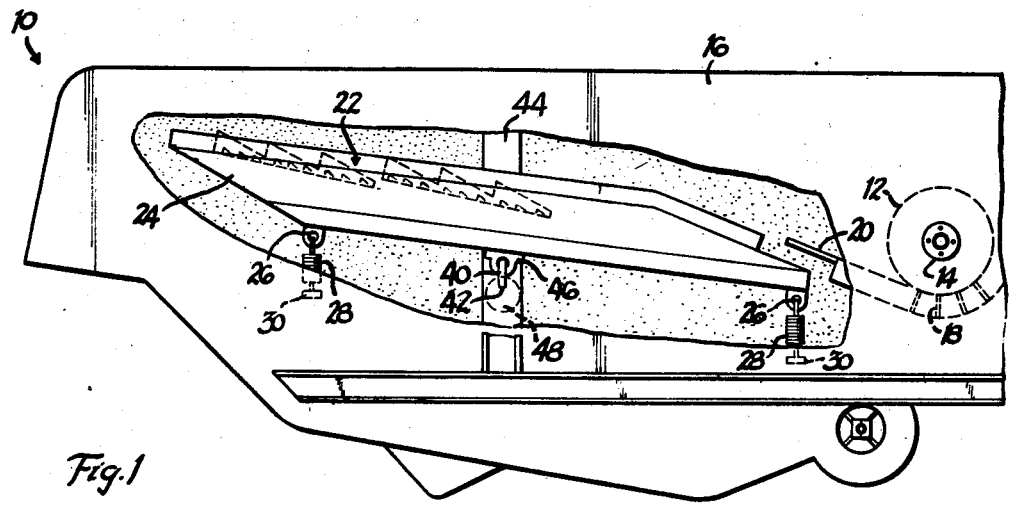
FIG. 1 is a fragmentary side elevation view of a threshing machine having the features of the invention incorporated therein.

With particular reference now to the drawings, there is shown FIG. 1 a threshing machine 10 having a threshing cylinder 12 rotatably journalled in bearings 14, which are fixed in the opposite sides of the housing or frame 16. A concave 18 is suitably supported in close proximity to the cylinder 14 and has a plurality of bars or fingers forming a grate 20 directed to a region above a strawrack 22.

Various elements of the harvesting machine, such as the return pan, the grain pan and cleaning shoe and the drive means for these elements, have not been shown since they form no part of the invention.

The harvested crop is passed between the threshing cylinder 14 and the concave 18 wherein the majority of the grain is separated from the remainder of the harvested crop. The harvested crop, having some of the grain remaining therein, is thereafter passed from the concave over the grate 20 onto the crop separator 22. The crop separator 22 is movably mounted in the harvesting machine 10 to be moved generally fore and aft between two positions in an oscillating motion to thereby vibrate the harvested crop upon the crop separator and separate the grain remaining therein from the remainder of the harvested crop.

According to the invention, the crop separator is mounted in a manner to increase the efficiency of the grain separation from the remainder of the harvested crop received on the crop separator 22. This is accomplished by resiliently mounting the crop separator on the harvesting machine and oscillating the crop separator with suitable drive means with the resilient means acting to increase the vibratory movement of the separator.

In the embodiment of the invention shown in FIG. 1, the crop separator 22 is illustratively shown as a conventional strawrack. The side members 24 of the strawrack are provided with lugs 26 at the forward and rear ends thereof. Resilient means, such as springs 28, each having one end connected to one of the brackets 26 carried by the side members 24 and the opposite end connected to a bracket 30 fixed on the housing 16 of the threshing machine 10.

The drive means for moving the strawrack in a generally fore and aft direction may be any suitable drive means, which are well known in the art. In the embodiment illustrated in FIG. 1, the drive means includes a crank journal 40 rotated about a common axis 42, which is journalled in transversely spaced vertically extending beams 44 carried by the housing 16. The crank journal 40 is connected to the space side members 24 through bearing brackets 46 fixed to the lower portion of the side members with the crank journal rotated by a pulley 48 driven by the power source (not shown) which forms a part of the threshing machine 10.

Rotation of the crank journal 40 will produce an oscillating motion on the strawrack 22 and the springs 28 will produce a more positive oscillating action and increased vibration of the strawrack as it is being oscillated by the driving means. The combined action of the driving crank journal and the tension springs will drive the strawrack in a closed loop path generally shown at A in FIG. 2.

Although the resilient mounting means has been shown in the form of four springs connected to the respective lower corners of the strawrack, it will be readily apparent that any number of springs can be connected to the forward and rear end of the straw rack and suitably interconnected with the threshing machine on a bar extending between the spaced brackets 32 on the housing 16. Also, the springs may be mounted in a vertical position as shown in FIG. 1, a horizontal position, or at an angle with respect to the horizontal as shown in FIG. 3.

Figure 2:
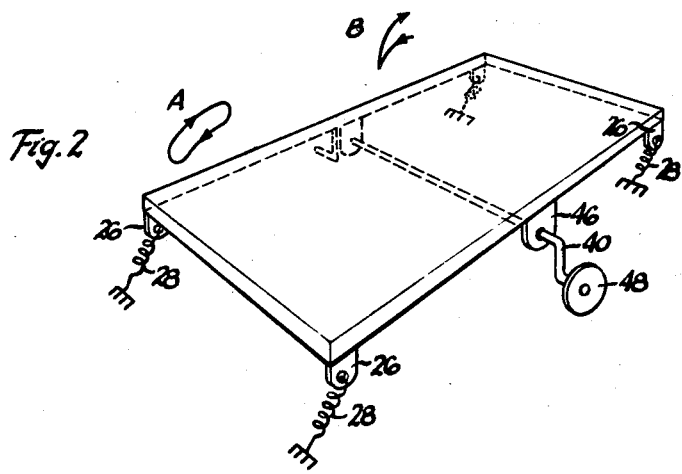
FIGS. 2, 3 and 4 are schematic views of a strawrack showing three different types of mounting means of the present invention.

If desired, the crank journal 40 may be oscillated between two spaced points of less than one hundred eighty degrees (180°) about the common axis thereby producing a rocking action, as illustratively shown at B in FIG. 2.

Figure 3:
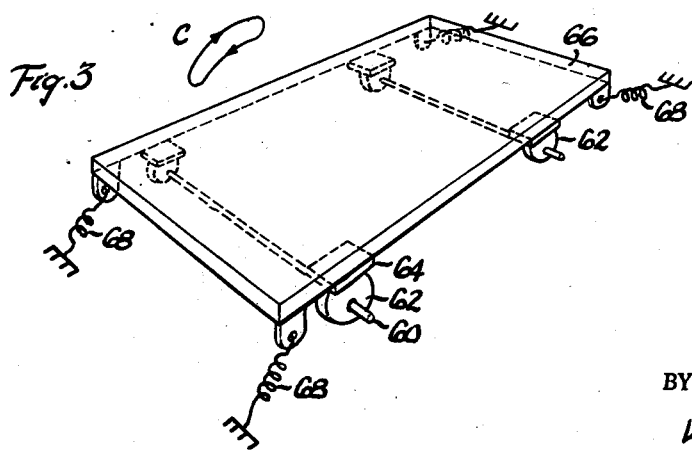

In the modified form of the invention shown in FIG. 3 the crank journal 40 is replaced by a pair of spaced shafts 60 having cams 62 in contacting engagement with brackets 64 secured to the lower portion of the straw rack 66. The springs 68, which are disposed at an angle with respect to the rack, will tend to continually move the straw rack downwardly. Therefore, as the cams are being rotated, the combined action of the rotating cams 62 and the springs 68 will produce a generally closed loop path of the rack, illustratively shown at C in FIG. 3, which will produce a positive abrupt movement of the rack, thereby increasing the oscillating and vibrating action of the rack.

Figure 4:
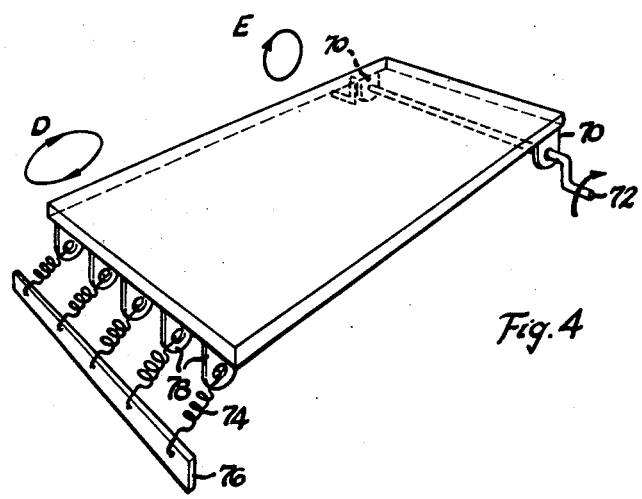

A further modified form of the invention is shown in FIG. 4 wherein one end of the strawrack is provided with brackets 70 which pivotally receive a crank journal 72 having its ends forming a common axis journalled in the housing 16. The opposite end of the strawrack is resiliently supported by a plurality of springs 74, having one end secured to a bar 76, which extends transversely of the housing 16 and is connected to the oppositely disposed sides thereof. The opposite ends of the respective springs are connected to brackets 78 carried by the end of the straw rack 70. Therefore, one end of the rack will be moved in a generally closed loop, as shown at E, while the opposite end will be forced by the action of the springs in a generally elliptical closed loop, as shown at D.

The springs 76 are preferably of the conventional cone type which will suspend the rack between the bar and the crank journal 72 and the spring forces during rotation of the shaft will produce the elliptical or egg-shaped closed loop path of the adjacent end of the crop separator.

Figure 5:
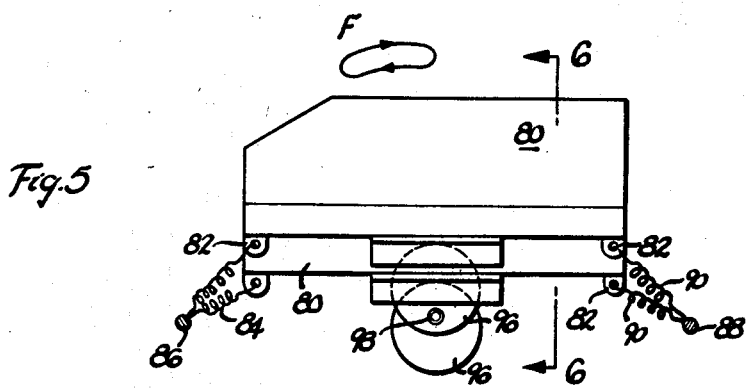
FIG. 5 is a schematic view of the crop separator comprising a plurality of walker sections mounted in accordance with the present invention.
Figure 6:
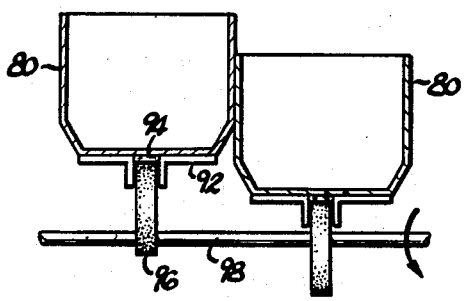
FIG. 6 is a view taken generally along the line 6—6 of FIG. 5.

FIGS. 5 and 6 show a further modified form of the invention wherein the crop separator comprises a plurality of walker sections transversely spaced intermediate the side walls of the housing 16. The walker sections, generally designated at 80, (only two being shown) each have brackets 82 fixed to the opposite ends thereof. One end of a spring 84 is connected to each of the brackets 82 carried on the forward end of the respective walkers and the opposite end of the spring is connected to a member 86, which extends transversely between the side walls of the housing 16 (not shown in FIG. 6).

The rear end of each walker section is likewise resiliently connected to a member 88 extending between the side walls of the housing 16 through springs 90 having one end connected to the brackets 82 of the respective walkers 80 and the opposite ends connected to the member 88.

The lower surface of each walker is provided with a pair of L-shaped brackets 92 having one leg fixed to the lower surface of a walker section and the opposite leg extending downwardly therefrom, with the downwardly extending legs being mounted in space relation to each other. A slide or contact plate 94 is disposed adjacent the surface of each walker section 80 intermediate the brackets 92 and is engageable with a cam 96, a plurality of which are mounted on a common shaft 98 journalled in the side walls of the housing 16. The cams 96 are connected to the shaft approximately one hundred eighty degrees (180°) out of phase so that while one walker section is being raised the second walker section is being lowered. A generally fore and aft and upward and downward movement is produced by rotating the shaft 98 and the tension springs 84 and 90 will produce an abrupt positive response of the walker sections to thereby drive each walker section in a generally arcuate closed loop path, as shown at F in FIG. 5.

I claim:
1. In a threshing machine including a frame supporting a threshing cylinder and a crop separator with mounting and driving means operatively supporting and oscillating said crop separator in a longitudinal housing of said machine, the improvement of said mounting and driving means comprising a transversely extending driven shaft disposed below said crop separator intermediate opposite ends thereof, axially spaced eccentric cam means fixed to said shaft and engaging said crop separator and spring means operatively connecting opposite ends of said crop separator to said frame and maintaining said crop separator in engagement with said cam means whereby rotation of said shaft will oscillate said crop separator relative to said frame.

2. A threshing machine as defined in claim 1, including the further improvement of said crop separator comprising a plurality of transversely spaced and juxtaposed walker sections with said spring means connecting each end of each walker section to said frame and said shaft having individual cam means for each walker section with adjacent cam means generating camming surfaces upon which each walker section is adapted to lie and which camming means are out of phase whereby to move adjacent sections in opposite directions upon rotation of said shaft.

References Cited

UNITED STATES PATENTS

| 2,402,340 | 6/1946 | Parmenter | 209—415 XR |
| 3,123,552 | 3/1964 | Lowry | 209—326 |

FOREIGN PATENTS

| 734,004 | 7/1932 | France. |
| 855,353 | 11/1952 | Germany. |

ANTONIO F. GUIDA, Primary Examiner